Sept. 23, 1924.

H. W. O'DOWD

GAS STOVE

Filed Dec. 1, 1921

INVENTOR
H. W. O'Dowd
BY
Wm. J. Dolan
ATTORNEY.

Sept. 23, 1924. 1,509,526
H. W. O'DOWD
GAS STOVE
Filed Dec. 1, 1921 2 Sheets-Sheet 2
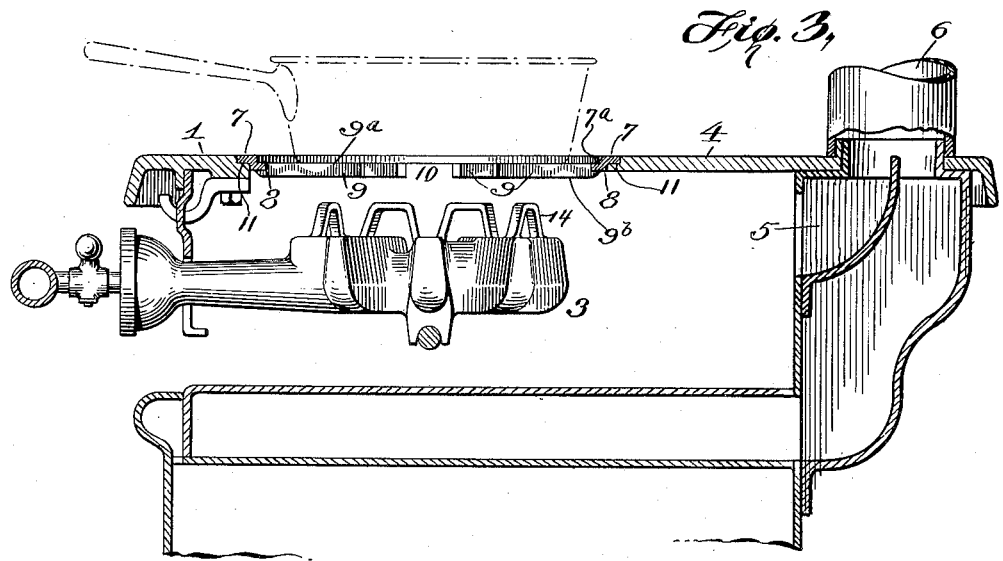
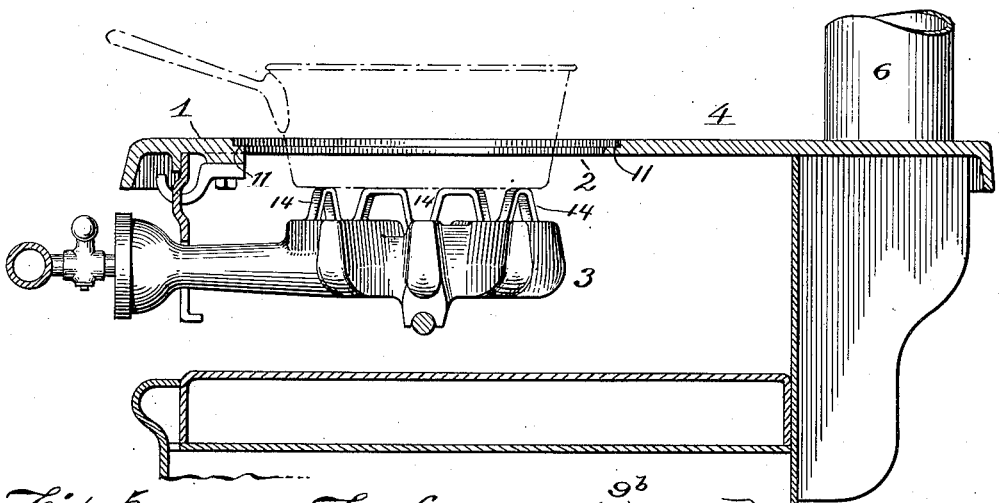
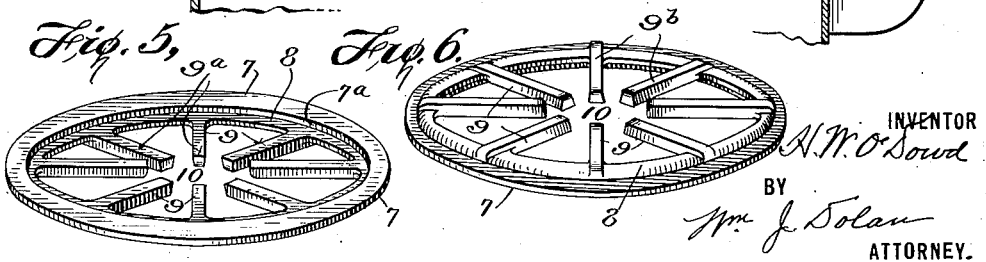

Patented Sept. 23, 1924.

1,509,526

UNITED STATES PATENT OFFICE.

HENRY W. O'DOWD, OF JERSEY CITY, NEW JERSEY, ASSIGNOR TO WILLIAM M. CRANE COMPANY, A CORPORATION OF NEW YORK.

GAS STOVE.

Application filed December 1, 1921. Serial No. 519,276.

*To all whom it may concern:*

Be it known that I, HENRY W. O'DOWD, a citizen of the United States, residing at Jersey City, county of Hudson, and State of New Jersey, have invented certain new and useful Improvements in Gas Stoves, of which the following is a specification.

This invention relates to gas stoves and has for its object to provide for the support of the utensil at different distances from the heating burner, to the end that the maximum heating efficiency without waste of fuel may be secured without regard to variations in the supply of the gas and the consequent height of the heating flame.

The invention is of peculiar advantage and importance in gas stoves used in natural gas districts, where the supply of gas varies greatly at different seasons of the year, in certain seasons there being a full supply giving a high burner flame, and at other seasons a diminished supply with a corresponding low burner flame. To meet these varying conditions and to provide for the support of the utensil closer to or farther from the burner according to the size of the flame issuing therefrom, my invention consists of a utensil supporting grid of improved form and construction adapted to seat in the pot opening of the stove top in reverse positions, and formed with an offset supporting portion which will support the utensil at a given distance from the burner when the grid is in one position, and which in a reverse position will support the utensil at a different distance from the burner. A portable utensil supporting lid is associated with the grid and adapted to seat in the depression formed by the offset portion thereof, and thereby support the utensil in an intermediate position. A further positioning of the utensil still closer to the burner is provided for by removing the grid entirely and setting the utensil within the pot opening so as to be supported by the burner itself, which latter for this purpose is provided with upstanding supporting members so as to bring the bottom of the utensil in close proximity to the orifices in the heating burner.

In the accompanying drawings:

Fig. 3 is a similar view on the line 3—3 of Fig. 1.

Fig. 4 is a view similar to Fig. 3 with the supporting grid removed showing the utensil supported by the burner in close proximity thereto.

Fig. 5 is a perspective view of the grid.

Fig. 6 is a similar view of the reverse side of the same.

Figure 1:
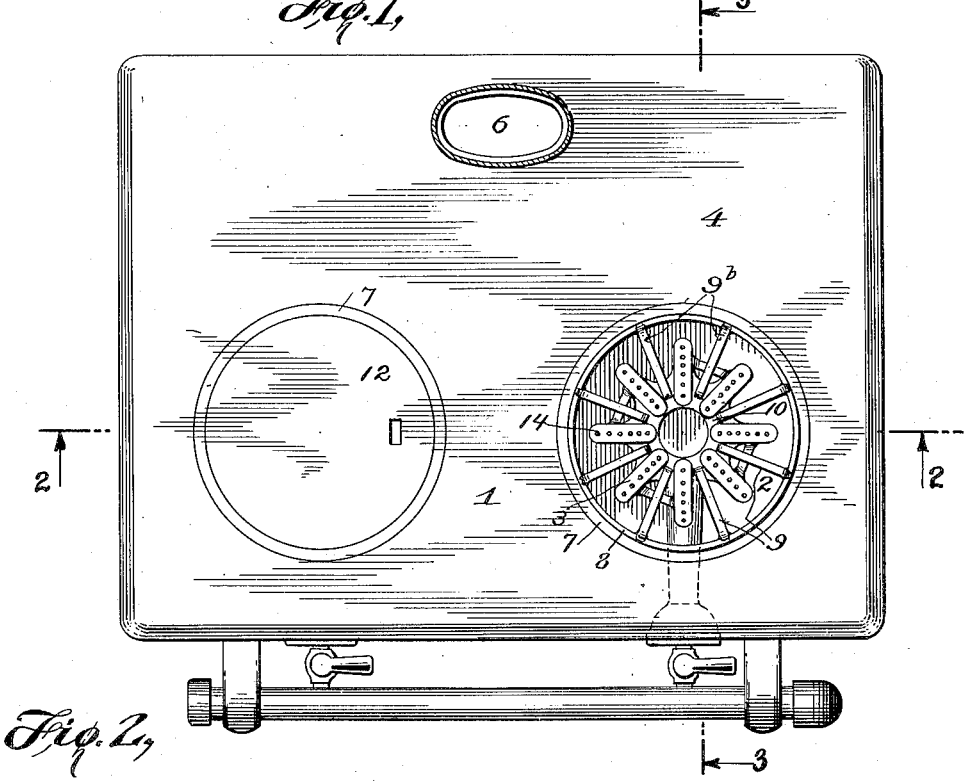
Fig. 1 is a top plan view of a gas stove equipped with the improved grid constituting the present invention.

Referring to the drawings:

The invention is shown applied in connection with the type of gas stove known as "smooth top," wherein a smooth top 1 is provided with the usual circular pot openings 2—2, two in the present instance, disposed at the front of the top, with gas burners 3—3 suitably supported beneath and in registration with said openings as usual, the arrangement being such that the heating gases and products of combustion after heating the utensils, will flow rearwardly beneath and heat the intact rear portion 4 of the top and will find their exit through a flue 5 leading from beneath the top at its rear, and will finally escape through a pipe 6 extending upwardly from the flue.

The utensil supporting grid constituting the present invention is best shown in Figs. 5 and 6 and consists of a circular edge flange 7 having connected with its inner edge an offset flange 8 from the inner edge of which a series of utensil supporting arms or members 9 extend radially towards the center and terminate a short distance from the center, thereby leaving a free open space 10 at the center of the grid. The surfaces $9^a$ of said arms are flush with the surface of the offset flange 8, which has the effect of forming a concavity or depression in one side of the grid bounded at its periphery by the circular inner edge $7^a$ of the flange 7 as clearly shown in Fig. 5, the said surfaces $9^a$ being effective as utensil supporting surfaces when the grid is in the position shown in Fig. 3. The arms extend axially beyond the opposite side of the flange 8 and have their opposite surfaces $9^b$ flush with each other and adapted to conjointly support the utensil when the grid is in a position reverse from that of Fig. 3.

The grid is adapted to seat in the pot opening in reverse positions, in which positions the utensil may be supported respectively by the opposite surfaces 9ª and 9ᵇ of the supporting arms. When in one position as in Fig. 3, the flange 7 of the grid rests on a ledge 11 of the stove top surrounding the pot opening, with the outer edge of the flange surrounded by the edge of the opening above the ledge and with its upper side flush with the stove top, while the outer edge of the offset flange 8 will abut against the edge of the pot opening beneath the ledge. In this position of the grid, the utensil will be supported by the surfaces 9ª of the arms in the cavity produced by the offsetting of the arms as described, the bottom of the utensil being thus supported below the upper surface of the stove top and at a given distance from the burner. In the reverse position of the grid as shown to the right in Figs. 1 and 3, the opposite side of the flange 7 will rest on the ledge 11 and the surfaces 9ᵇ of the supporting arms become effective as supports for the utensil, and the latter will be supported above the stove top at a greater distance from the burner than in the case just described. In order to support the utensil at an intermediate position between the two extremes afforded by the respective surfaces 9ª and 9ᵇ of the supporting arms, a portable lid 12 is provided which is adapted to be seated in the concavity in the grid within the inner edge of the flange 7, when the grid is in the position shown in Fig. 3, and as shown to the left in Fig. 2, the upper face of the lid being flush with the stove top and supporting the utensil with its bottom flush with the top and at a distance from the burner between the two positions of the utensil above described.

Figure 2:
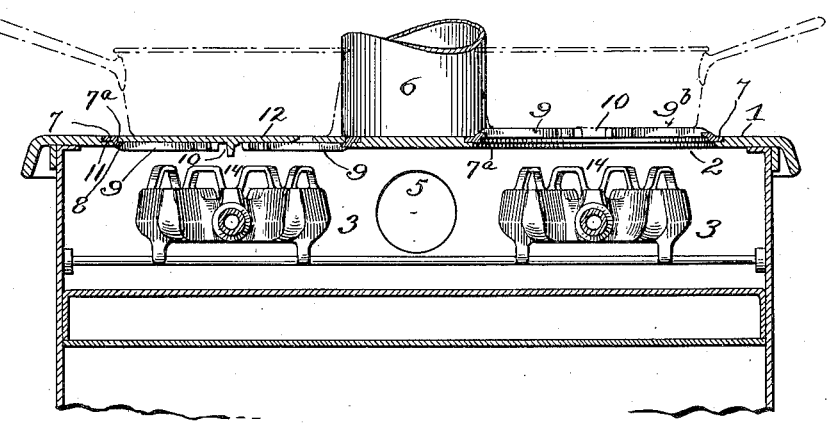
Fig. 2 is a vertical sectional elevation of the same on the line 2—2 of Fig. 1.

In the use of the device, when the supply of gas is full and a high flame issues from the burner, the grid is placed in the pot opening in the position shown at the right in Fig. 2, with the result that the utensil will be supported by the surfaces 9ᵇ of the supporting arms at its greatest distance from the burner. When the supply of gas is lower and the flame correspondingly low, the grid is reversed in position and set as shown in Fig. 3 and the utensil will be supported by the surfaces 9ª of the supporting arm nearer to the burner; and when the supply of gas is in an intermediate condition, the lid 12 is employed as shown in Fig. 2 which will support the utensil at an intermediate distance from the burner. The utensil may be supported still closer to the burner in cases where the supply of gas is still more limited, by removing the grid and lid entirely and setting the utensil in the pot opening and supporting it on the burner itself, which burner is for this purpose provided with a number of upstanding radially extending members or brackets 14, disposed between the burner nozzles, the bottom of the utensil resting directly on these brackets and being supported in close proximity to the burner orifice as shown in Fig. 4.

It is seen therefore that by the employment of the improved grid in combination with the portable lid, three different positions of the utensil relative to the burner, as regards the distance therefrom, may be provided for, whereby the greatest economy in heating under the most efficient conditions may be secured in localities where the supply of gas varies as described; and by providing for the removal of the grid and lid from the pot opening and providing the burner with suitable supporting members, the utensil may be brought still closer to the burner, which position of the utensil would be desirable under conditions where the gas supply is very restricted.

By constructing the utensil supporting members of the grid in the form of arms extending radially, they will, when the grid is in the position shown in Fig. 3, extend below the under surface of the top, and will form channels which have the effect of causing the heating currents and products of combustion to be distributed beneath the closed top and of inducing the flow of said currents generally towards the rear where the exit flue is located. In this way these currents in addition to furnishing the necessary heat for the utensil seated on the grid, will impart their heat to the intact portion of the smooth top in rear of the pot opening, so that this top may be utilized for heating additional utensils.

In the foregoing description and accompanying drawings the invention is set forth in the particular detailed form and construction which it is preferred to adopt but it will be understood the details may be variously changed and modified without departing from the spirit of the invention; and further it will be understood that the invention is not limited to any particular form or construction of the parts except in so far as such limitations are specified in the claims.

Having thus described my invention, what I claim is:

1. A utensil supporting grid adapted to seat in reverse positions in a pot opening in a gas stove above the heating burner therein, said grid comprising a peripheral flange and supporting members extending inwardly from the flange and offset axially relative to the face of the flange to produce a utensil receiving and supporting cavity in the grid.

2. A utensil supporting grid adapted to seat in reverse positions in a pot opening in a gas stove top above the burner therein, said grid comprising a peripheral flange and supporting members extending inwardly from the flange and offset axially relative to the face of the flange to produce a cavity in the grid, in combination with a utensil sustaining member adapted to seat in said cavity with its upper surface flush with the stove top.

3. A utensil supporting grid adapted to seat in reverse positions in a pot opening in a stove top above the burner therein, said grid comprising an outer peripheral flange, an inner flange extending inwardly from the outer flange and offset axially relative thereto to produce a utensil receiving cavity, and utensil supporting members extending inwardly from the inner flange with their side surfaces at one side flush with the side of the second flange.

4. In combination with a gas stove top provided with a pot opening therein surrounded by a supporting ledge, a heating burner sustained beneath the opening, a utensil supporting grid comprising a peripheral flange adapted to seat on said ledge with its face flush with the upper surface of the stove top, and supporting members extending inwardly from the flange and offset axially relative to the said face to produce a utensil receiving cavity, whereby the offset members will support the utensil in said cavity below the surface of the stove top, said grid being adapted to be turned side for side and its peripheral flange seated in reverse position on the ledge, whereby the supporting members in the reverse position will sustain the utensil above the upper surface of the stove top.

In testimony whereof, I have affixed my signature hereto.

HENRY W. O'DOWD.